(12) United States Patent
Wang et al.

(10) Patent No.: US 11,838,909 B2
(45) Date of Patent: Dec. 5, 2023

(54) SIDELINK RESOURCE POOL FOR CONTROL SIGNALING

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 17/247,739

(22) Filed: Dec. 21, 2020

(65) Prior Publication Data

US 2022/0201671 A1    Jun. 23, 2022

(51) Int. Cl.
*H04W 72/20* (2023.01)
*H04W 72/02* (2009.01)
*H04W 72/0446* (2023.01)
*H04W 92/18* (2009.01)

(52) U.S. Cl.
CPC ........... *H04W 72/20* (2023.01); *H04W 72/02* (2013.01); *H04W 72/0446* (2013.01); *H04W 92/18* (2013.01)

(58) Field of Classification Search
CPC . H04W 72/0493; H04W 72/02; H04W 8/005; H04W 72/0446; H04W 92/18; H04W 72/0406; H04L 5/0078; H04L 5/0053; H04L 5/0055
See application file for complete search history.

(56) References Cited

U.S. PATENT DOCUMENTS

| | | | | |
|---|---|---|---|---|
| 10,856,176 B2 * | 12/2020 | Lee | ......................... | H04W 4/40 |
| 2021/0168574 A1 * | 6/2021 | Zhang | ................. | H04W 56/001 |
| 2021/0176747 A1 * | 6/2021 | Yang | ................. | H04W 72/0446 |
| 2021/0282121 A1 * | 9/2021 | Selvanesan | ........... | H04W 72/23 |
| 2021/0297221 A1 * | 9/2021 | Lee | ....................... | H04L 5/0055 |
| 2021/0306106 A1 * | 9/2021 | Park | ...................... | H04W 72/23 |
| 2021/0329633 A1 * | 10/2021 | Xing | ..................... | H04L 5/0048 |
| 2021/0329650 A1 * | 10/2021 | Zhang | .................. | H04L 5/1469 |
| 2022/0014338 A1 * | 1/2022 | Yoshioka | ............... | H04W 48/14 |
| 2022/0053460 A1 * | 2/2022 | Yu | .......................... | H04W 72/02 |
| 2022/0124726 A1 * | 4/2022 | Zhao | .................... | H04L 1/1861 |
| 2022/0167313 A1 * | 5/2022 | Zhou | .................... | H04L 5/0053 |
| 2022/0346080 A1 * | 10/2022 | Ren | ........................ | H04W 72/20 |

FOREIGN PATENT DOCUMENTS

EP           3573315 A1    11/2019
WO      2019028847 A1     2/2019

OTHER PUBLICATIONS

International Search Report and Written Opinion—PCT/US2021/062647—ISA/EPO—dated Apr. 5, 2022.

* cited by examiner

*Primary Examiner* — Oussama Roudani
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information associated with a dedicated resource pool dedicated for communication of sidelink control information in a sidelink network. The UE may transmit or receive the sidelink control information in the sidelink network utilizing the dedicated resource pool. Numerous other aspects are described.

30 Claims, 8 Drawing Sheets

SIDELINK RESOURCE POOL FOR CONTROL SIGNALING

FIELD OF THE DISCLOSURE

Aspects of the present disclosure generally relate to wireless communication and to techniques and apparatuses for providing a sidelink resource pool for control signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors operatively coupled to the memory, the memory and the one or more processors configured to: receive configuration information associated with a dedicated resource pool dedicated for communication of sidelink control information in a sidelink network; and transmit or receive the sidelink control information in the sidelink network utilizing the dedicated resource pool.

In some aspects, a method of wireless communication performed by a UE includes receiving configuration information associated with a dedicated resource pool dedicated for communication of sidelink control information in a sidelink network; and transmitting or receiving the sidelink control information in the sidelink network utilizing the dedicated resource pool.

In some aspects, a non-transitory computer-readable medium storing a set of instructions for wireless communication includes one or more instructions that, when executed by one or more processors of a UE, cause the UE to: receive configuration information associated with a dedicated resource pool dedicated for communication of sidelink control information in a sidelink network; and transmit or receive the sidelink control information in the sidelink network utilizing the dedicated resource pool.

In some aspects, an apparatus for wireless communication includes means for receiving configuration information associated with a dedicated resource pool dedicated for communication of sidelink control information in a sidelink network; and means for transmitting or receiving the sidelink control information in the sidelink network utilizing the dedicated resource pool.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
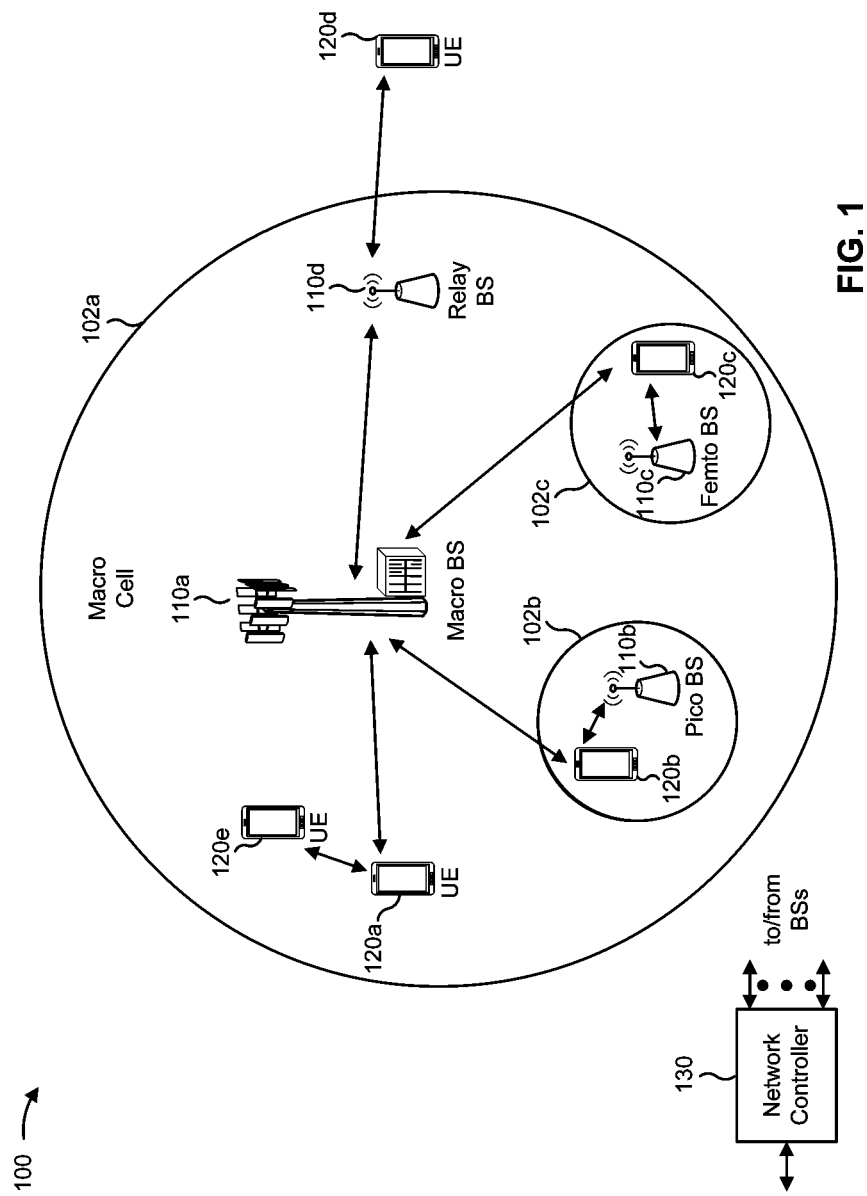
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
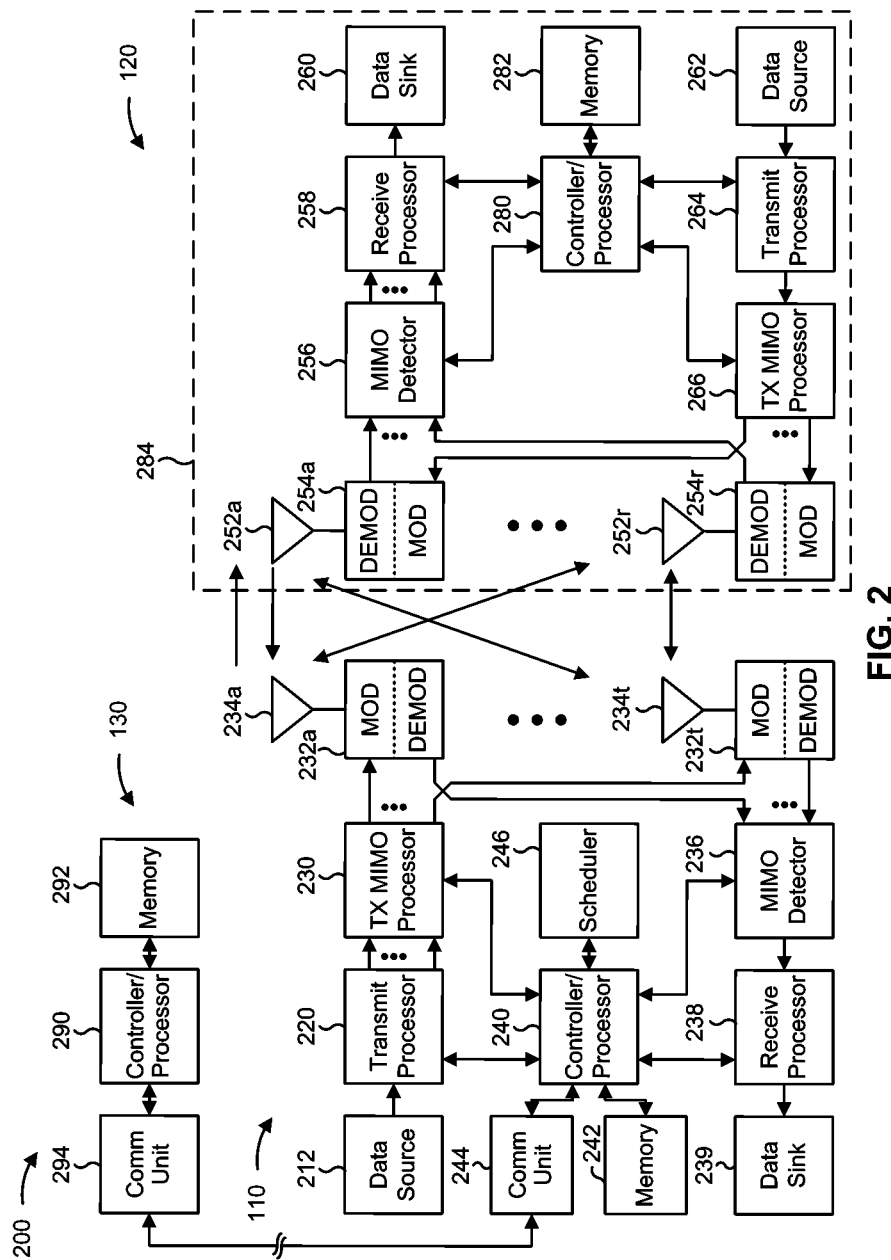
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-8.

Controller/processor 240 of base station 110, controller/processor 280 of UE 120, and/or any other component(s) of FIG. 2 may perform one or more techniques associated with providing a sidelink resource pool for control signaling, as described in more detail elsewhere herein. For example, controller/processor 240 of base station 110, controller/processor 280 of UE 120, and/or any other component(s) of FIG. 2 may perform or direct operations of, for example, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, and/or other processes as described herein. In some aspects, executing instructions may include running the instructions, converting the instructions, compiling the instructions, and/or interpreting the instructions, among other examples.

In some aspects, UE (e.g., UE 120) includes means for receiving configuration information associated with a dedicated resource pool dedicated for communication of sidelink control information in a sidelink network; and/or means for transmitting or receiving the sidelink control information in the sidelink network utilizing the dedicated resource pool. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for transmitting a slot format indication to another UE, the slot formation indication indicating whether a given slot is configured for transmitting sidelink-downlink communication to the other UE or for receiving sidelink-uplink communication from the other UE.

In some aspects, the UE includes means for transmitting a slot format indication via a physical sidelink feedback channel, the slot formation indication indicating whether a given slot is configured for transmitting sidelink-downlink communication or for receiving sidelink-uplink communication.

In some aspects, the UE includes means for transmitting a slot format indication to another UE, one or more bits included in the slot formation indication indicating whether one or more slots are configured for transmitting sidelink-downlink communication or for receiving sidelink-uplink communication.

In some aspects, the UE includes means for transmitting a group-common slot format indication to a plurality of UEs, the slot formation indication including a plurality of respective bits, associated with the plurality of UEs, for indicating whether a given slot is configured for transmitting sidelink-downlink communication or for receiving sidelink-uplink communication.

In some aspects, the UE includes means for transmitting a slot format indication via sidelink control information, the slot formation indication indicating whether a given slot is configured for transmitting sidelink-downlink communication or for receiving sidelink-uplink communication.

In some aspects, the UE includes means for transmitting a slot format indication to another UE, one or more bit fields included in the slot formation indication indicating a periodicity associated with a communication configuration of a slot, the transmitting the slot formation indication comprising periodically transmitting the SFI.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A sidelink network may include a base station and a plurality of UEs. The base station may communicate with each of the plurality of UEs via respective access links. The plurality of UEs may operate in sidelink modes to communicate (e.g., transmit and/or receive data) with one another via one or more sidelink channels.

In one sidelink mode (e.g., Mode-1 Resource Allocation Mode), the base station may configure and control utilization of sidelink resources (e.g., resource blocks, subchannels) accessible for sidelink communication. For instance, the base station may configure a predetermined number of sidelink resources and may control selection by a transmitting UE of one or more of the configured sidelink resources to transmit data to one or more receiving UEs.

In another sidelink mode (e.g., Mode-2 Resource Allocation Mode), the base station may configure the predetermined number of sidelink resources accessible for sidelink communication. One or more of the plurality of UEs, and not the base station, may control utilization of the configured sidelink resources by performing scheduling of communications in the sidelink network. For instance, without involvement of the base station, the transmitting UE may autonomously reserve one or more of the configured sidelink resources (e.g., reserved resources) for data transmissions thereon during a given timeslot to the one or more receiving UEs.

The transmitting UE may transmit sidelink control information (SCI) to inform a receiving UE that the reserved resources are unavailable during the given timeslot for selection by the receiving UE. Based on receiving the SCI, the receiving UE may avoid selecting the reserved resources during the given timeslot. In other words, the receiving UE may rely on receiving the SCI prior to the data transmissions by the transmitting UE during the given timeslot to avoid a contention (e.g., where the receiving UE concurrently utilizes the reserved resources during the given timeslot).

Because the SCI includes a nominal payload size, it may be inefficient to utilize an entire timeslot to transmit the SCI. Consequently, the transmitting UE may transmit the SCI via a physical sidelink control channel (PSCCH), which is transmitted along with a physical sidelink shared channel (PSSCH). Also, the transmitting UE may transmit the PSSCH when the transmitting UE has a threshold amount of data to transmit via the PSSCH. In other words, the transmitting UE may not be able to transmit the SCI via the PSCCH until the transmitting UE has accumulated the threshold amount of data to transmit via the PSSCH. Accumulating the threshold amount of data may introduce a delay in the transmitting UE transmitting the SCI. The delay may cause the receiving UE to receive the SCI after the transmitting UE begins to utilize the reserved resources during the given timeslot. Without prior receipt of the SCI, the receiving UE may also begin to utilize the reserved resources during the given timeslot, thereby causing a contention. As a result, data communication in the sidelink network may experience an interruption or stoppage.

Various aspects of techniques and apparatuses described herein may provide a sidelink resource pool for control signaling. In some aspects, the techniques and apparatuses described herein may provide a dedicated sidelink resource pool dedicated for communication of control information (e.g., SCI). The dedicated sidelink resource pool may enable a transmitting UE to transmit the control information without introducing a delay associated with accumulating a threshold amount of data. A receiving UE may receive the control information, including information about reserved resources, prior to the transmitting UE utilizing the reserved resources during a given timeslot. Based at least in part on receiving the control information, the receiving UE may avoid concurrently utilizing the reserved resources during the timeslot. In this way, a contention may be avoided, and data communication in a sidelink network, including the transmitting UE and the receiving UE, may continue without interruption or stoppage. Additionally, UE resources (e.g., amount of processing, utilization of memory, or the like) and/or network resources (e.g., management resources, bandwidth, or the like) may be used to perform other tasks in the sidelink network as opposed to being inefficiently consumed to address contentions and retransmissions due to the contentions.

In some aspects, a UE may receive configuration information associated with a dedicated resource pool dedicated for communication of sidelink control information in a sidelink network; and may transmit or receive the sidelink control information in the sidelink network utilizing the dedicated resource pool.

Figure 3:
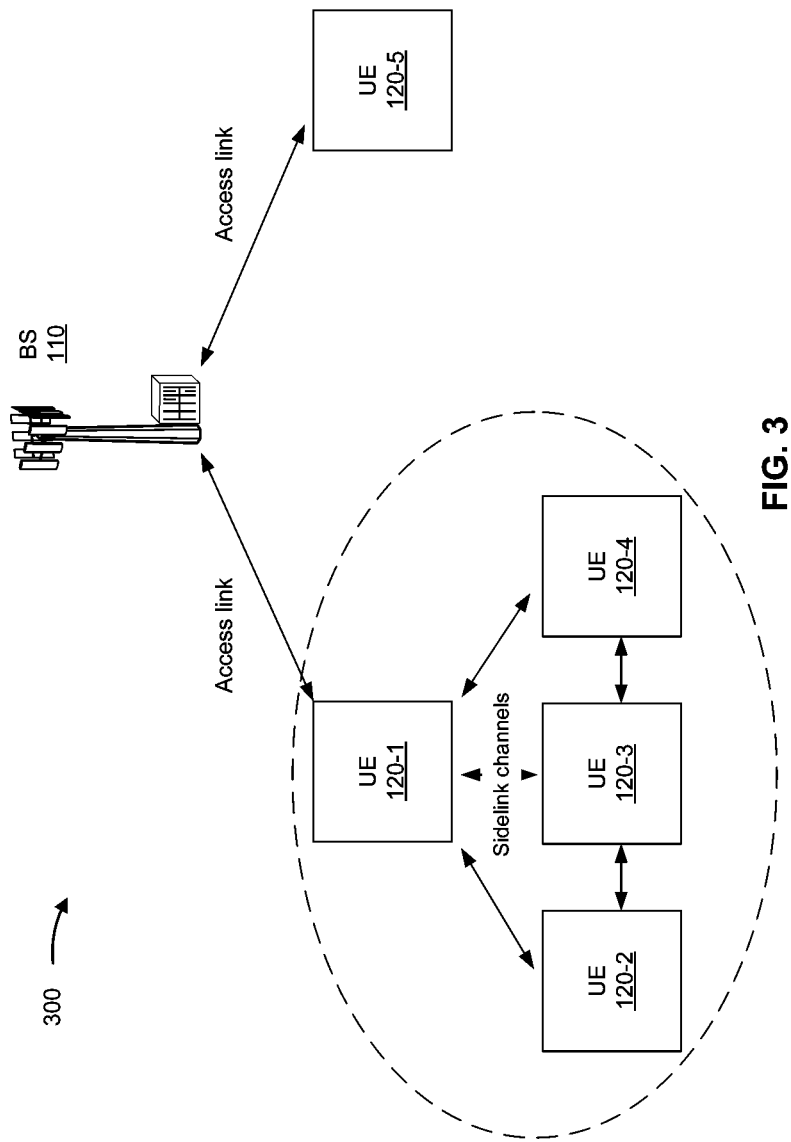
FIG. 3 is a diagram illustrating an example associated with providing a sidelink resource pool for control signaling, in accordance with various aspects of the present disclosure.

FIG. 3 is a diagram illustrating an example 300 associated with providing a sidelink resource pool for control signaling, in accordance with various aspects of the present disclosure. A sidelink network may include a base station 110 and a plurality of UEs (shown as UE 120-1 through UE 120-5 and collectively referred to as UEs 120). The BS 110 may communicate with the UE 120-1 via a first access link and/or communicate with the UE 120-5 via a second access link. The first access link and/or the second access link may be implemented utilizing, for example, a Uu interface. Access link communications between the BS 110 and the UE 120-1 may be transmitted and received via the first access link, and access link communications between the BS 110 and the UE 120-5 may be transmitted and received via the second access link.

In the sidelink network, UE 120-1, UE 120-2, UE 120-3, and UE 120-4 (collectively referred to as sidelink UEs 120) may communicate with one another via one or more sidelink channels. For instance, a transmitting UE (e.g., UE 120-1) may communicate with one or more receiving UEs (e.g., UE 120-2, UE 120-2, or UE 120-3) that receive communications transmitted by the transmitting UE. In some aspects, one or more sidelink channels among the sidelink UEs 120 may be implemented utilizing, for example, a PC5 interface. Sidelink communications may be transmitted and received via the sidelink channels. In some aspects, the UE 120-1 may be referred to as a programmable logic controller (PLC) UE or an anchor UE, and the UE 120-2, the UE 120-3, and/or the UE 120-4 may be referred to as a sensor/actuator (S/A) UE or a client UE. The UEs 120 may include one or more UEs described elsewhere herein, such as UE 120 discussed with respect to FIG. 2.

As indicated above, FIG. 3 is provided as an example. Other examples may differ from what is described with respect to FIG. 3.

Figure 4:
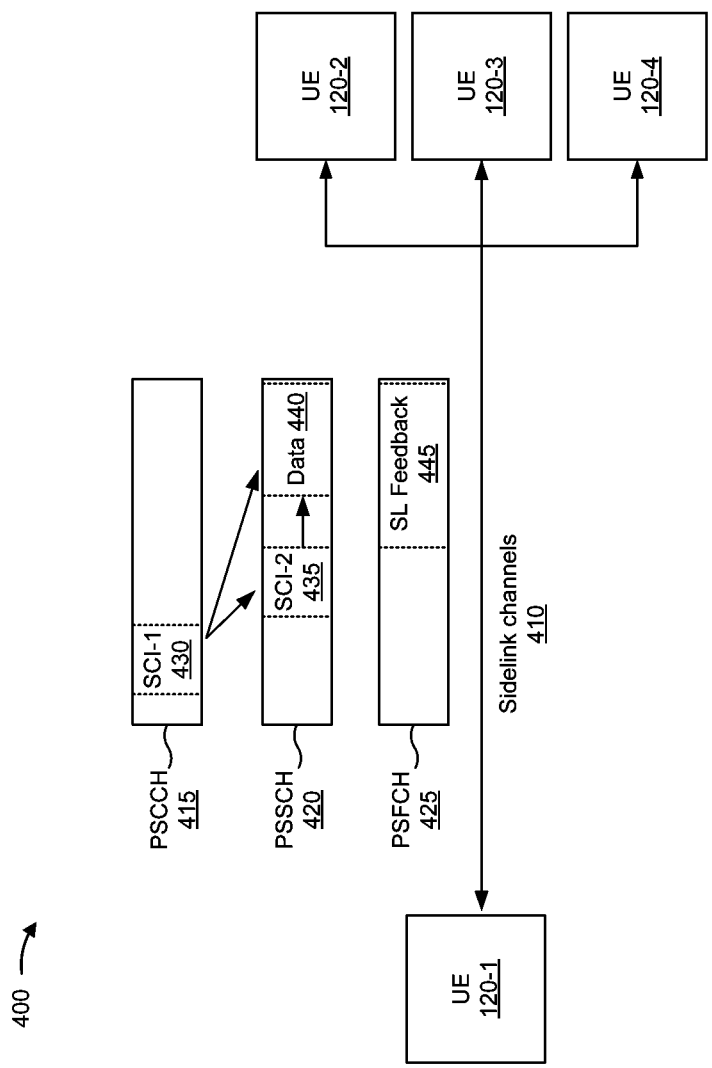
FIG. 4 is a diagram illustrating an example associated with providing a sidelink resource pool for control signaling, in accordance with various aspects of the present disclosure.

FIG. 4 is a diagram illustrating an example 400 associated with providing a sidelink resource pool for control signaling, in accordance with various aspects of the present disclosure. A sidelink network may include a plurality of UEs including, for example, the sidelink UEs (e.g., anchor UE 120-1 and client UEs 120-2, 120-3, 120-4) communicating with each other. The plurality of UEs included in the sidelink communication network may include a plurality of UEs within a given geographical area (e.g., a given radius around a given UE). In some aspects, the plurality of UEs within the given geographical area may provide a UE density associated with the sidelink communication network. The UE density may identify a number of UEs within a threshold distance of the given UE. In some aspects, the sidelink UEs may include one or more UEs described elsewhere herein, such as UE 120 discussed with respect to FIG. 2 and/or the UEs 120 discussed with respect to FIG. 3.

As shown in FIG. 4, the sidelink UEs may communicate via the one or more sidelink channels 410. Communications utilizing the one or more sidelink channels 410 may include, for example, P2P communications, D2D communications, V2X communications (e.g., V2V communications, V2I communications, and/or vehicle-to-person (V2P) communications), and/or mesh networking communications.

In some aspects, the sidelink channels 410 may use a PC5 interface and/or may operate in, for example, a high frequency band (e.g., the 4.9 GHz band) and/or an unlicensed or shared frequency band (e.g., an NR unlicensed (NR-U) frequency band). Additionally, or alternatively, the sidelink UEs may synchronize a timing of transmission time intervals (TTIs) (e.g., frames, subframes, slots, and/or symbols) using global navigation satellite system (GNSS) timing.

As further shown in FIG. 4, the sidelink channels 410 may include a PSCCH 415, a PSSCH 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with, for example, BS 110 via an access link or an access channel. The PSSCH 420 may be used to communicate data, similar to a physical downlink shared channel (PDSCH) and/or a physical uplink shared channel (PUSCH) used for cellular communications with, for example, BS 110 via an access link or an access channel.

The sidelink channels 410 may carry sidelink control information (SCI) to indicate various control information used for sidelink communications. The sidelink control information may include, for example, sidelink control information part 1 (SCI-1) 430 and sidelink control information part 2 (SCI-2) 435. The SCI-1 430 may be included in the PSCCH 415 and the SCI-2 435 may be included in the PSSCH 420. The SCI-1 430 may include a scheduling assignment regarding one or more resources of the sidelink channels 410 (e.g., time resources, frequency resources, and/or spatial resources). In some aspects, the scheduling assignment may include information identifying a resource reserved for utilization by one or more UEs in the sidelink network. The SCI-1 430 may also include information to enable a UE in the sidelink network to perform RSRP measurements associated with a reserved resource. The SCI-2 435 may include various types of information, such as, for example, a hybrid automatic repeat request (HARQ) process ID, a new data indicator (NDI) associated with the data 440, a unique identifier associated with a transmitting UE (a unique TX ID), a unique identifier associated with a receiving UE (a unique RX ID), and/or a channel state information (CSI) report trigger.

The PSSCH 420 may also include data 440 and information such as, for example, information for decoding sidelink communications on the PSSCH 420, a quality of service (QoS) priority value, a resource reservation period, a PSSCH demodulation reference signal (DMRS) pattern, an SCI format and/or a beta offset for sidelink control information part 2 (SCI-2) 435 transmitted on the PSSCH 420, a quantity of PSSCH DMRS ports, a modulation coding scheme (MCS), a priority associated with the reserved resource, a chosen selection scheme, a policy parameter used by another the UE to choose another resource selection scheme, and/or a traffic condition associated with the sidelink network.

In some aspects, the sidelink UEs may transmit both the SCI-1 430 and the SCI-2 435. The PSFCH 425 may be used to communicate sidelink (SL) feedback 445, such as, for example, HARQ feedback (e.g., acknowledgement or negative acknowledgement (ACK/NACK) information).

Figure 5:
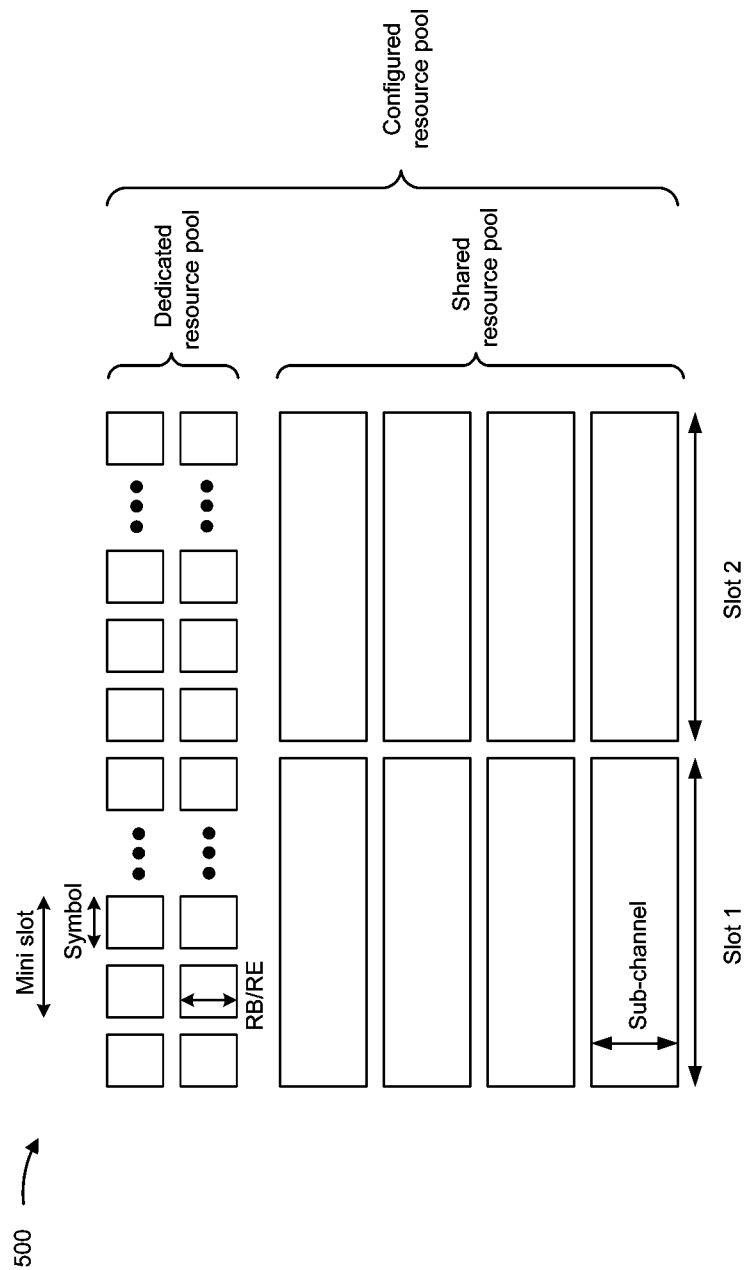
FIG. 5 is a diagram illustrating an example associated with providing a sidelink resource pool for control signaling, in accordance with various aspects of the present disclosure.

In some aspects, the BS 110 may transmit to the anchor UE 120-1 configuration information associated with a resource pool configured for sidelink communication. As shown in example 500 of FIG. 5, the configured resource pool may include a shared resource pool including shared resources for communication over the PSCCH 415, the PSSCH 420, the PSFCH 425, or the like. Such shared resources may have a granularity of a subchannel across frequency (e.g., in a frequency domain) and a granularity of a slot across time (e.g., in a time domain). As also shown in FIG. 5, the configured resource pool may include a dedicated resource pool including control information (CI) resources dedicated for communication of control information among the sidelink UEs. The CI resources may be frequency-division multiplexed with the shared resources. The CI resources may have a granularity of one or more resource blocks and/or one or more resource elements across frequency and a granularity of one or more symbols and/or one or more mini-slots (e.g., a group of symbols) across time.

In some aspects, the CI resources may be dedicated for communication of sidelink downlink control information (S-DCI) from the anchor UE 120-1 to a client UE and for communication of sidelink uplink control information (S-UCI) from the client UE to the anchor UE 120-1. Such S-DCI and S-UCI information may include information related to resource selection, collision detection, communication of channel state information (CSI) reports, scheduling request information, or the like. The information related to resource selection and collision detection may be associated with inter-coordination among the sidelink UEs including reserving of resources by a sidelink UE for transmission of data. The scheduling request information may be associated with a request from a client UE for scheduling a resource by the anchor UE 120-1 for transmission of data by the client UE.

In some aspects, the granularity of the CI resources (e.g., resource blocks and/or resource elements, symbols, and/or mini-slots) may enable flexibility in communication of the S-UCI and the S-DCI. For instance, the anchor UE 120-1 may utilize one or more resource blocks and/or resource elements to transmit S-DCI based at least in part on a payload size associated with the S-DCI. For instance, the anchor UE 120-1 may use a single resource block and/or resource element to transmit S-DCI, the anchor UE 120-1 may use two resource blocks and/or resource elements to transmit S-DCI having a payload size greater than an amount of data that may be transmitted using a single resource block and/or a resource element, the anchor UE 120-1 may use three resource blocks and/or resource elements to transmit S-DCI having a payload size greater than an amount of data that may be transmitted using two resource blocks and/or resource elements, and so on.

Similarly, the anchor UE 120-1 may utilize one or more symbols to transmit S-DCI based at least part on the payload size associated with the S-DCI. For instance, the anchor UE 120-1 may use a single symbol (or mini-slot) to transmit S-DCI, the anchor UE 120-1 may use two symbols to transmit S-DCI having a payload size greater than an amount of data that may be transmitted using a single symbol, the anchor UE 120-1 may use three symbols to transmit S-DCI having a payload size greater than an amount of data that may be transmitted using two symbols, and so on.

The anchor UE 120-1 may utilize a combination of one or more resource blocks and/or resource elements and one or more symbols to transmit S-DCI based at least in part on the payload size associated with the S-DCI. In some aspects, the one or more resource blocks and/or one or more resource elements may equal a subchannel and the one or more symbols may equal a mini-slot or a slot.

Similarly, a client UE may utilize one or more resource blocks and/or resource elements to transmit S-UCI based at least in part on a payload size associated with the S-DCI. For instance, the client UE may use a single resource block and/or resource element to transmit S-UCI, the client UE may use two resource blocks and/or resource elements to transmit S-UCI having a payload size greater than an amount of data that may be transmitted using a single resource block and/or a resource element, the client UE may use three resource blocks and/or resource elements to transmit S-UCI having a payload size greater than an amount that may be transmitted using two resource blocks and/or resource elements, and so on.

Similarly, the client UE may utilize one or more symbols to transmit S-UCI based at least part on the payload size associated with the S-UCI. For instance, the client UE may use a single symbol (or mini-slot) to transmit S-UCI, the client UE may use two symbols to transmit S-UCI having a payload size greater than an amount of data that may be transmitted using a single symbol, the client UE may use three symbols to transmit S-UCI having a payload size greater than an amount of data that may be transmitted using two symbols, and so on.

The client UE may utilize a combination of one or more resource blocks and/or resource elements and one or more symbols to transmit S-UCI based at least in part on the payload size associated with the S-UCI. In some aspects, the one or more resource blocks and/or one or more resource elements may equal a subchannel and the one or more symbols may equal a mini-slot or a slot.

Further, the dedicated resource pool may support repetition of control information (e.g., S-DCI and/or S-UCI) to enable adequate reception of the control information when a measure of coverage (e.g., coverage parameter) fails to satisfy a threshold coverage level (e.g., the measure of coverage is less than the threshold coverage level). For instance, to enable adequate reception of the control information by a client UE, the anchor UE 120-1 may transmit S-DCI utilizing a set of CI resources including one or more resource blocks and/or resource elements and may repeat transmission of the S-DCI utilizing another set of CI resources including one or more resource blocks and/or resource elements. Similarly, to enable adequate reception of the control information by a client UE, the anchor UE 120-1 may transmit S-DCI utilizing a set of CI resources including one or more symbols and may repeat transmission of the S-DCI utilizing another set of CI resources including one or more symbols.

Similarly, to enable adequate reception of the control information by the anchor UE 120-1, a client UE may transmit S-UCI utilizing a set of CI resources including one or more resource blocks and/or resource elements and may repeat transmission of the S-UCI utilizing another set of CI resources including one or more resource blocks and/or resource elements. Also, to enable adequate reception of the control information by the anchor UE 120-1, the client UE may transmit S-UCI utilizing a set of CI resources including one or more symbols and may repeat transmission of the S-UCI utilizing another set of CI resources including one or more symbols.

The dedicated resource pool may also support aggregation of CI resources to enable adequate reception of the control information (e.g., S-DCI and/or S-UCI) when the measure of coverage (e.g., coverage parameter) fails to satisfy the threshold coverage level (e.g., the measure of coverage is less than the threshold coverage level). For instance, to enable adequate reception of the control information by a client UE, the anchor UE 120-1 may transmit S-DCI utilizing a plurality of aggregated resource blocks and/or resource elements. Similarly, to enable adequate reception of the control information by a client UE, the anchor UE 120-1 may transmit S-DCI utilizing a plurality of aggregated symbols. Similarly, to enable adequate reception of the control information by the anchor UE 120-1, a client UE may transmit S-UCI utilizing a plurality of aggregated resource blocks and/or resource elements. Also, to enable adequate reception of the control information by the anchor UE 120-1, the client UE may transmit S-UCI utilizing a plurality of aggregated symbols.

In some aspects, a transmitter (e.g., BS 110 or the anchor UE 120-1) may transmit, and a client UE may receive, scheduling information associated with utilization of the dedicated resource pool. For instance, the transmitter may schedule one or more CI resources (e.g., resource blocks, resource elements, and/or symbols) to be utilized by the anchor UE 120-1 for transmission of S-DCI and/or by the client UE for transmission of S-UCI. Based at least in part on the scheduling information, the anchor UE 120-1 may utilize the scheduled CI resources transmission of S-DCI and/or the client UE may utilize the scheduled CI resources transmission of S-UCI.

Figure 6:
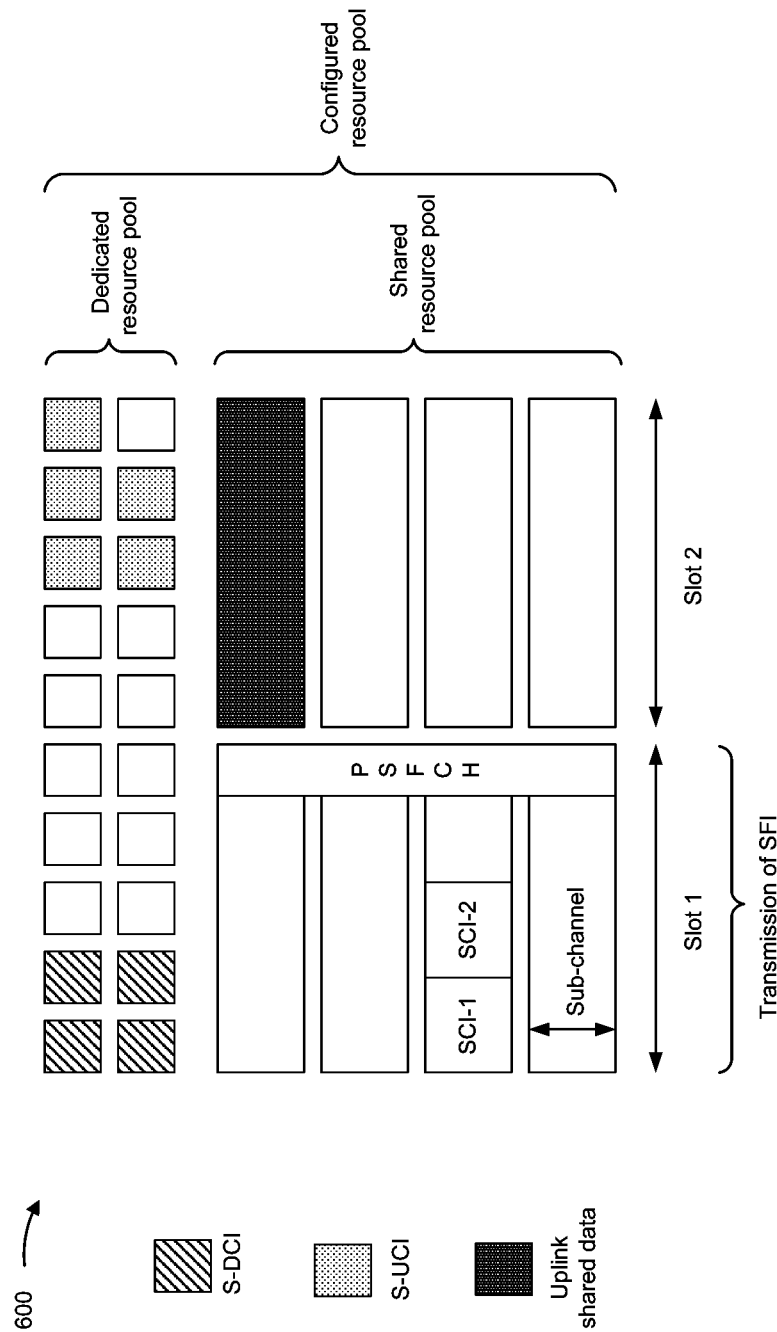
FIG. 6 is a diagram illustrating an example associated with providing a sidelink resource pool for control signaling, in accordance with various aspects of the present disclosure.

In some aspects, as shown in example 600 of FIG. 6, the anchor UE 120-1 may transmit a slot format indication (SFI) to one or more client UEs. The SFI may indicate a communication configuration associated with a given slot. For instance, the SFI may indicate whether shared resources and/or CI resources associated with the given slot are to be utilized for communicating downlink information (S-DCI and downlink shared data) or for communicating uplink information (S-UCI and uplink shared data).

In one example, the anchor UE 120-1 may transmit the SFI via the PSFCH 425 during a given slot (e.g., slot 1). One or more bit fields in the SFI may indicate whether the shared resources and/or the CI resources associated with one or more slots are to be utilized for communicating downlink information or for communicating uplink information. In some aspects, a single bit in a bit field in the SFI may indicate whether the shared resources and/or the CI resources associated with the next slot (e.g., slot 2) are to be utilized for communicating downlink information or for communicating uplink information. In some aspects, a plurality of bits in the bit field in the SFI may respectively indicate whether the shared resources and/or the CI resources associated with the next plurality of slots are to be utilized for communicating downlink information or for communicating uplink information.

In some aspects, a number of the plurality of bits may be based at least in part on a periodicity of the PSFCH 425. For instance, when the periodicity of the PSFCH 425 is five slots (e.g., PSFCH 425 is transmitted every five slots), the SFI may include five bits to respectively indicate whether the shared resources and/or the CI resources associated with the next five slots are to be utilized for communicating downlink information or for communicating uplink information. In some aspects, the shared resources and/or the CI resources associated with a slot (e.g., slot 1) including the PSFCH 425 may be reserved for communicating downlink information.

In another example, the anchor UE 120-1 may transmit the SFI via S-DCI during a slot (e.g., slot 1). For instance, the anchor UE 120-1 may transmit the SFI by utilizing a single CI resource (e.g., a single resource block or a single resource element or a single symbol) to indicate to a given client UE whether the shared resources and/or the CI resources associated with the next slot (e.g., slot 2) are to be utilized for communicating downlink information or for communicating uplink information. In some aspects, the anchor UE 120-1 may transmit a group-common SFI by utilizing a plurality of CI resources (e.g., a plurality of resource blocks, a plurality of resource elements, or a plurality of symbols) to indicate to a select group of client UEs, from among the client UEs, whether the shared resources and/or the CI resources associated with the next slot (e.g., slot 2) are to be utilized for communicating downlink information or for communicating uplink information. In some aspects, the group-common SFI may include respective bits associated with the client UEs in the select group. In some aspects, the select group of client UEs may include all client UEs in communication with the anchor UE 120-1.

In yet another example, the anchor UE 120-1 may transmit the SFI via SCI-1 and/or SCI-2 during a slot (e.g., slot 1). In some aspects, the SCI-1 and/or SCI-2 may include the SFI in the form of one or more bit fields to indicate whether the shared resources and/or the CI resources associated with one or more slots are to be utilized for communicating downlink information or for communicating uplink information. In some aspects, the SCI-1 and/or SCI-2 may include the SFI in the form of a single bit to indicate whether the shared resources and/or the CI resources associated with the next slot (e.g., slot 2) are to be utilized for communicating downlink information or for communicating uplink information. In some aspects, the SCI-1 and/or SCI-2 may include the SFI in the form of a plurality of bits to respectively indicate whether the shared resources and/or the CI resources associated with the next plurality of slots are to be utilized for communicating downlink information or for communicating uplink information.

In some aspects, the anchor UE 120-1 may transmit the SFI using any combination of transmitting the SFI via the PSFCH 425, via the S-DCI, and/or via the SCI-1 and/or SCI-2 to transmit the communication configuration. In some aspects, the anchor UE 120-1 may transmit the SFI using any combination of transmitting the SFI via the PSFCH 425, via the S-DCI, and/or via the SCI-1 and/or SCI-2 to transmit an updated communication configuration. In some aspects, S-DCI, SCI-1, and/or SCI-2 may indicate the shared resources and/or the CI resources there are to be utilized for communicating uplink shared data and/or S-UCI. Additionally, or alternatively, the S-DCI, SCI-1, and SCI-2 may indicate a payload size and/or a format associated with communicating the uplink shared data and/or the S-UCI.

In some aspects, a client UE may perform a sensing procedure to sense availability of a CI resource for transmission of S-UCI by the client UE. During the sensing procedure, the client UE may utilize a sensing window that includes information indicating reservation of one or more of the CI resources (e.g., reserved CI resources) for utilization by another sidelink UE. Such reserved CI resources may not be utilized by the client UE. The client UE may also perform received signal reference power (RSRP) measurements associated with the reserved CI resources and may determine RSRP resources for which the RSRP measurements satisfy a threshold RSRP level (e.g., RSRP measurement is equal to or greater than the threshold RSRP level). Such RSRP resources may be impacted by utilization of the reserved CI resources and may not be utilized by the client UE. The client UE may reserve and utilize CI resources for which the RSRP measurements fail to satisfy the threshold RSRP level (e.g., RSRP measurement is lower than the threshold RSRP level). Additionally, the client UE may reserve and utilize one or more of a remainder of the CI resources from the dedicated resource pool.

By utilizing the techniques and apparatuses, associated with providing a dedicated sidelink resource pool for communication of control information, a transmitting UE may transmit the control information (S-DCI or S-UCI) without a delay associated with accumulating a threshold amount of data to transmit via a PSSCH. A receiving UE may receive the control information, including information about reserved resources, prior to the transmitting UE utilizing the reserved resources to transmit data transmissions, thereby avoiding a contention. As a result, data communication in a sidelink network, including the transmitting UE and the receiving UE, may continue without interruption or stoppage. The granularity associated with CI resources in the dedicated resource pool may enable flexibility in transmitting the control information based at least in part on payload size, aggregation, repetition, or the like. Additionally, UE resources (e.g., amount of processing, utilization of memory, or the like) and/or network resources (e.g., management resources, bandwidth, or the like) may be used for other tasks in the sidelink network rather than being inefficiently consumed to address contentions and retransmissions due to the contentions.

As indicated above, FIGS. 4-6 are provided as examples. Other examples may differ from what is described with respect to FIGS. 4-6.

Figure 7:
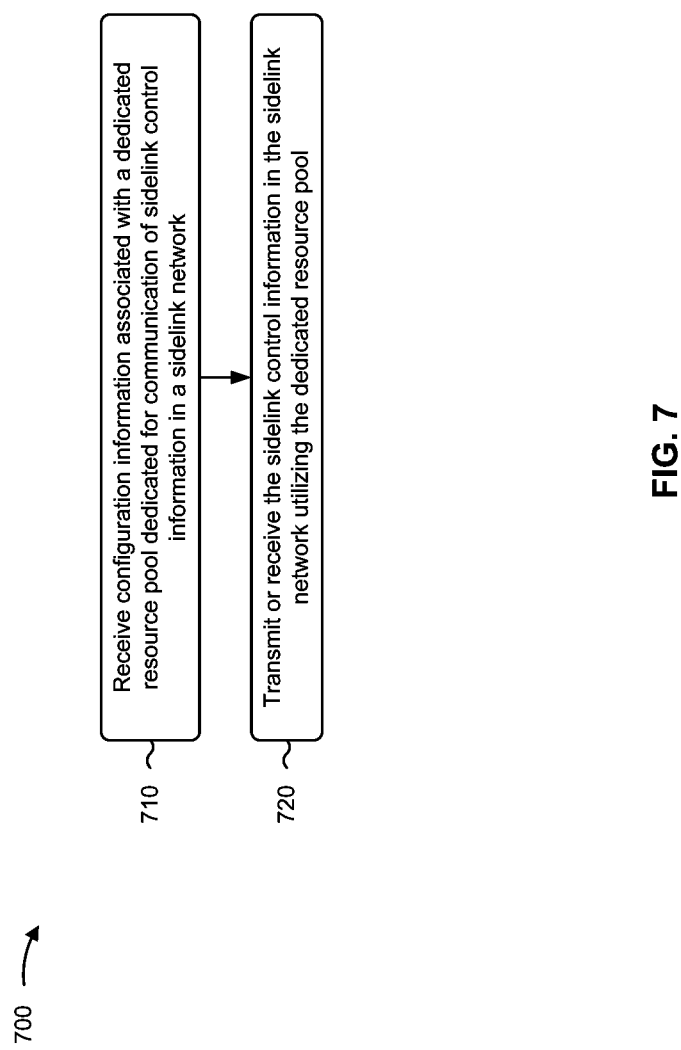
FIG. 7 is a diagram illustrating an example process associated with providing a sidelink resource pool for control signaling, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120) performs operations associated with providing a sidelink resource pool for control signaling.

As shown in FIG. 7, in some aspects, process 700 may include receiving configuration information associated with a dedicated resource pool dedicated for communication of sidelink control information in a sidelink network (block 710). For example, the UE (e.g., using reception component 802, depicted in FIG. 8) may receive configuration information associated with a dedicated resource pool dedicated for communication of sidelink control information in a sidelink network, as described above.

As further shown in FIG. 7, in some aspects, process 700 may include transmitting or receiving the sidelink control information (S-DCI and/or S-UCI) in the sidelink network utilizing the dedicated resource pool (block 720). For example, the UE (e.g., using transmission component 804, depicted in FIG. 8) may transmit or receiving the sidelink control information in the sidelink network utilizing the dedicated resource pool, as described above.

Process 700 may include additional aspects, such as any single aspect or any combination of aspects described below and/or in connection with one or more other processes described elsewhere herein.

In a first aspect, transmitting the sidelink control information includes transmitting the sidelink control information via a sidelink-downlink communication to another UE.

In a second aspect, alone or in combination with the first aspect, receiving the sidelink control information includes receiving the sidelink control information via a sidelink-uplink communication from another UE.

In a third aspect, alone or in combination with one or more of the first and second aspects, the dedicated resource pool is frequency-division multiplexed with a shared resource pool associated with a physical shared sidelink channel.

In a fourth aspect, alone or in combination with one or more of the first through third aspects, the dedicated resource pool may include an unused resource block associated with a shared resource pool associated with a physical shared sidelink channel.

In a fifth aspect, alone or in combination with one or more of the first through fourth aspects, the dedicated resource pool may include a resource block associated with a sub-channel of a shared resource pool associated with a physical shared sidelink channel.

In a sixth aspect, alone or in combination with one or more of the first through fifth aspects, the dedicated resource pool may be associated with one or more symbols in a time domain and with one or more resource blocks or resource elements in a frequency domain.

In a seventh aspect, alone or in combination with one or more of the first through sixth aspects, the dedicated resource pool supports scheduling of resource blocks based at least in part on a payload size associated with the sidelink control information or based at least in part on a coverage parameter associated with the sidelink network.

In an eighth aspect, alone or in combination with one or more of the first through seventh aspects, the dedicated resource pool supports repetition and aggregation of the sidelink control information.

In a ninth aspect, alone or in combination with one or more of the first through eighth aspects, the dedicated resource pool supports utilization of one or more resource blocks included in the dedicated resource pool based at least in part on a payload size associated with the sidelink control information.

In a tenth aspect, alone or in combination with one or more of the first through ninth aspects, process 700 includes receiving, from a transmitter, scheduling information associated with utilization of the dedicated resource pool.

In an eleventh aspect, alone or in combination with one or more of the first through tenth aspects, process 700 includes performing a sensing procedure associated with utilization of the dedicated resource pool, the performing the sensing procedure including reserving a resource block or a resource element for transmitting the sidelink control information.

In a twelfth aspect, alone or in combination with one or more of the first through eleventh aspects, the dedicated resource pool may be associated with a slot in a time domain and with one or more resource blocks or resource elements in a frequency domain.

In a thirteenth aspect, alone or in combination with one or more of the first through twelfth aspects, process 700 includes receiving the sidelink control information via a sidelink-uplink communication, wherein the dedicated resource pool is associated with a slot in a time domain.

In a fourteenth aspect, alone or in combination with one or more of the first through thirteenth aspects, process 700 includes transmitting the sidelink control information via a sidelink-downlink communication, wherein the dedicated resource pool is associated with a symbol in a time domain.

In a fifteenth aspect, alone or in combination with one or more of the first through fourteenth aspects, process 700 includes transmitting a slot format indication (SFI) to another UE, the SFI indicating whether a given slot is configured for transmitting sidelink-downlink communication to the other UE or for receiving sidelink-uplink communication from the other UE.

In a sixteenth aspect, alone or in combination with one or more of the first through fifteenth aspects, process 700 includes transmitting an SFI via a physical sidelink feedback channel, the SFI indicating whether a given slot is configured for transmitting sidelink-downlink communication or for receiving sidelink-uplink communication.

In a seventeenth aspect, alone or in combination with one or more of the first through sixteenth aspects, process 700 includes transmitting an SFI to another UE, one or more bits included in the SFI indicating whether one or more slots are configured for transmitting sidelink-downlink communication or for receiving sidelink-uplink communication.

In an eighteenth aspect, alone or in combination with one or more of the first through seventeenth aspects, process 700 includes transmitting a group-common SFI to a plurality of UEs, the SFI including a plurality of respective bits, associated with the plurality of UEs, for indicating whether a given slot is configured for transmitting sidelink-downlink communication or for receiving sidelink-uplink communication.

In a nineteenth aspect, alone or in combination with one or more of the first through seventeenth aspects, process 700 includes transmitting an SFI via sidelink control information, the SFI indicating whether a given slot is configured for transmitting sidelink-downlink communication or for receiving sidelink-uplink communication.

In a twentieth aspect, alone or in combination with one or more of the first through nineteenth aspects, process 700 includes transmitting an SFI to another UE, one or more bit fields included in the SFI indicating a periodicity associated with a communication configuration of a slot, the transmitting the SFI comprising periodically transmitting the SFI.

In a twenty-first aspect, alone or in combination with one or more of the first through twentieth aspects, process 700 includes transmitting an SFI to another UE, the SFI indicating a communication configuration of a slot, and transmitting sidelink control information or a physical shared feedback channel to indicate an updated communication configuration of the slot.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
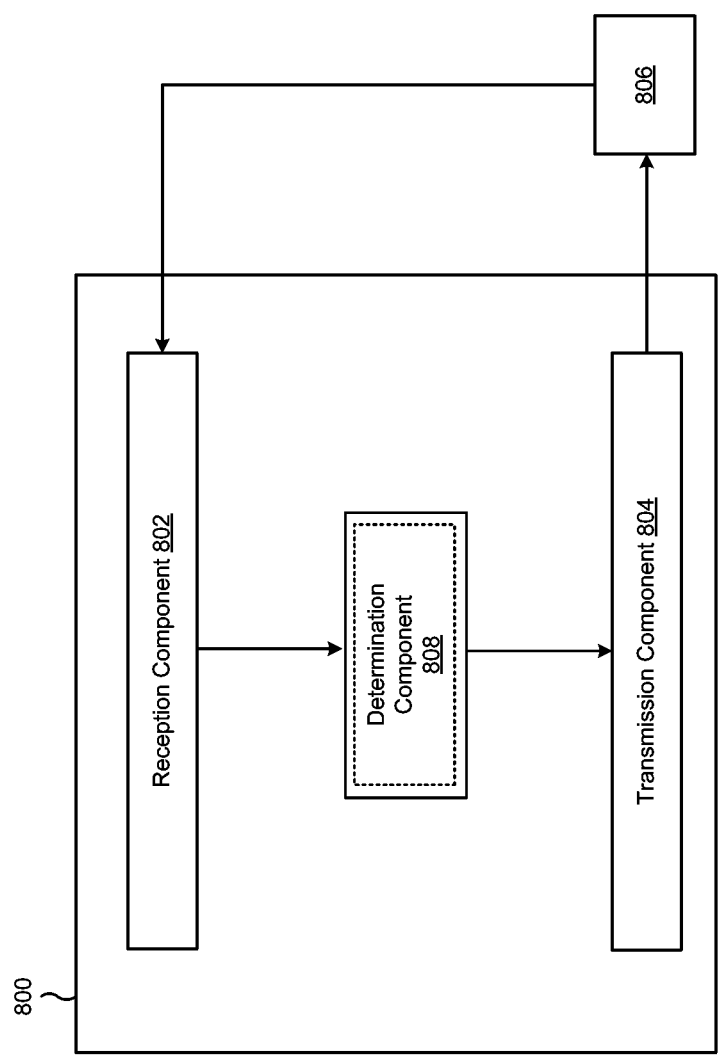
FIG. 8 is a diagram illustrating an example apparatus associated with providing a sidelink resource pool for control signaling, in accordance with various aspects of the present disclosure.

FIG. 8 is a block diagram of an example apparatus 800 for wireless communication. The apparatus 800 may be a UE (e.g., UE 120), or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a determination component 808, among other examples.

In some aspects, the apparatus 800 may be configured to perform one or more operations described herein in connection with FIGS. 3-6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE 120 described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE 120 described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE 120 described above in connection with FIG. 2. In some aspects, the transmission component 804 may be co-located with the reception component 802 in a transceiver.

The reception component 802 may receive configuration information associated with a dedicated resource pool dedicated for communication of sidelink control information in a sidelink network. The transmission component 804 may transmit or receiving the sidelink control information in the sidelink network utilizing the dedicated resource pool.

The transmission component 804 may transmit a slot format indication to another UE, the slot formation indication indicating whether a given slot is configured for transmitting sidelink-downlink communication to the other UE or for receiving sidelink-uplink communication from the other UE.

The transmission component 804 may transmit a slot format indication via a physical sidelink feedback channel, the slot formation indication indicating whether a given slot is configured for transmitting sidelink-downlink communication or for receiving sidelink-uplink communication.

The transmission component 804 may transmit a slot format indication to another UE, one or more bits included in the slot formation indication indicating whether one or more slots are configured for transmitting sidelink-downlink communication or for receiving sidelink-uplink communication.

The transmission component 804 may transmit a group-common slot format indication to a plurality of UEs, the slot formation indication including a plurality of respective bits, associated with the plurality of UEs, for indicating whether a given slot is configured for transmitting sidelink-downlink communication or for receiving sidelink-uplink communication.

The transmission component 804 may transmit a slot format indication via sidelink control information, the slot formation indication indicating whether a given slot is configured for transmitting sidelink-downlink communication or for receiving sidelink-uplink communication.

The transmission component 804 may transmit a slot format indication to another UE, one or more bit fields included in the slot formation indication indicating a periodicity associated with a communication configuration of a slot, the transmitting the slot formation indication comprising periodically transmitting the SFI.

In some aspects, the determination component 808 may determine a configuration of the dedicated resource pool and enable transmission and reception of the sidelink control information utilizing the dedicated resource pool. In some aspects, the determination component 808 may determine information to be included in transmitted sidelink control information and/or may analyze information included in received sidelink control information.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of aspects of the present disclosure:

Aspect 1: A method of wireless communication performed by a user equipment (UE), comprising: receiving configuration information associated with a dedicated resource pool dedicated for communication of sidelink control information in a sidelink network; and transmitting or receiving the sidelink control information in the sidelink network utilizing the dedicated resource pool.

Aspect 2: The method of aspect 1, wherein transmitting the sidelink control information includes transmitting the sidelink control information via a sidelink-downlink communication to another UE.

Aspect 3: The method of any of aspects 1-2, wherein receiving the sidelink control information includes receiving the sidelink control information via a sidelink-uplink communication from another UE.

Aspect 4: The method of any of aspects 1-3, wherein the dedicated resource pool may include a resource block associated with a subchannel of a shared resource pool associated with a physical shared sidelink channel.

Aspect 5: The method of any of aspects 1-4, wherein the dedicated resource pool may be associated with one or more symbols in a time domain and with one or more resource blocks or resource elements in a frequency domain.

Aspect 6: The method of any of aspects 1-5, wherein the dedicated resource pool supports repetition or aggregation of the sidelink control information.

Aspect 7: The method of any of aspects 1-6, wherein the dedicated resource pool supports utilization of one or more resource blocks included in the dedicated resource pool based at least in part on a payload size associated with the sidelink control information.

Aspect 8: The method of any of aspects 1-7, further comprising: transmitting a slot format indication to another UE, the slot formation indication indicating whether a given slot is configured for transmitting sidelink-downlink communication to the other UE or for receiving sidelink-uplink communication from the other UE.

Aspect 9: The method of any of aspects 1-8, further comprising: transmitting a slot format indication via a physical sidelink feedback channel, the slot formation indication indicating whether a given slot is configured for transmitting sidelink-downlink communication or for receiving sidelink-uplink communication.

Aspect 10: The method of any of aspects 1-9, further comprising: transmitting a slot format indication to another UE, one or more bits included in the slot formation indication indicating whether one or more slots are configured for transmitting sidelink-downlink communication or for receiving sidelink-uplink communication.

Aspect 11: The method of any of aspects 1-10, further comprising: transmitting a group-common slot format indication to a plurality of UEs, the slot formation indication including a plurality of respective bits, associated with the plurality of UEs, for indicating whether a given slot is configured for transmitting sidelink-downlink communication or for receiving sidelink-uplink communication.

Aspect 12: The method of any of aspects 1-8 and aspects 10-11, further comprising: transmitting a slot format indication via sidelink control information, the slot formation indication indicating whether a given slot is configured for transmitting sidelink-downlink communication or for receiving sidelink-uplink communication.

Aspect 13: The method of any of aspects 1-12, further comprising: transmitting a slot format indication to another UE, one or more bit fields included in the slot formation indication indicating a periodicity associated with a communication configuration of a slot, the transmitting the slot formation indication comprising periodically transmitting the SFI.

Aspect 14: An apparatus for wireless communication at a device, comprising a processor; memory coupled with the processor; and instructions stored in the memory and executable by the processor to cause the apparatus to perform the method of one or more aspects of aspects 1-13.

Aspect 15: A device for wireless communication, comprising a memory and one or more processors coupled to the memory, the memory and the one or more processors configured to perform the method of one or more aspects of aspects 1-13.

Aspect 16: An apparatus for wireless communication, comprising at least one means for performing the method of one or more aspects of aspects 1-13.

Aspect 17: A non-transitory computer-readable medium storing code for wireless communication, the code comprising instructions executable by a processor to perform the method of one or more aspects of aspects 1-13.

Aspect 18: A non-transitory computer-readable medium storing a set of instructions for wireless communication, the set of instructions comprising one or more instructions that, when executed by one or more processors of a device, cause the device to perform the method of one or more aspects of aspects 1-13.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
  a memory; and
  one or more processors coupled to the memory, the one or more processors configured to:
    receive configuration information associated with a dedicated resource pool for sidelink communications in a sidelink network, wherein the dedicated resource pool includes a first group of resources dedicated for communication of sidelink control information and a second group of resources for communicating data via the sidelink network,
    wherein the first group of resources has a granularity of one or more resource elements across frequency and a granularity of one or more symbols across time, and
    wherein the second group of resources has a granularity of a subchannel across frequency and a granularity of a slot across time,
      wherein the subchannel comprises one or more resource blocks and the slot comprises a time period; and
    transmit or receive the sidelink control information in the sidelink network utilizing one or more resources included in the first group of resources.

2. The UE of claim 1, wherein the one or more processors, when transmitting the sidelink control information, are configured to transmit the sidelink control information via a sidelink-downlink communication to another UE.

3. The UE of claim 1, wherein the one or more processors, when receiving the sidelink control information, are configured to receive the sidelink control information via a sidelink-uplink communication from another UE.

4. The UE of claim 1, wherein the first group of resources includes a resource block associated with a subchannel of a shared resource pool associated with a physical shared sidelink channel.

5. The UE of claim 1, wherein the first group of resources is associated with a plurality of symbols in a time domain and with a plurality of resource blocks or resource elements in a frequency domain.

6. The UE of claim 1, wherein the first group of resources supports repetition or aggregation of the sidelink control information.

7. The UE of claim 1, wherein the first group of resources supports utilization of one or more resource blocks included in the first group of resources based at least in part on a payload size associated with the sidelink control information.

8. The UE of claim 1, wherein the one or more processors are further configured to:
  transmit a slot format indication to another UE, the slot format indication indicating whether a given slot is configured for transmitting sidelink-downlink communication to the other UE or for receiving sidelink-uplink communication from the other UE.

9. The UE of claim 1, wherein the one or more processors are further configured to:
  transmit a slot format indication via a physical sidelink feedback channel, the slot format indication indicating whether a given slot is configured for transmitting sidelink-downlink communication or for receiving sidelink-uplink communication.

10. The UE of claim 1, wherein the one or more processors are further configured to:
  transmit a slot format indication to another UE, one or more bits included in the slot format indication indicating whether one or more slots are configured for transmitting sidelink-downlink communication or for receiving sidelink-uplink communication.

11. The UE of claim 1, wherein the one or more processors are further configured to:
  transmit a group-common slot format indication to a plurality of UEs, the group-common slot format indication including a plurality of respective bits, associated with the plurality of UEs, for indicating whether a given slot is configured for transmitting sidelink-downlink communication or for receiving sidelink-uplink communication.

12. The UE of claim 1, wherein the one or more processors are further configured to:
  transmit a slot format indication via sidelink control information, the slot format indication indicating whether a given slot is configured for transmitting sidelink-downlink communication or for receiving sidelink-uplink communication.

13. The UE of claim 1, wherein the one or more processors are further configured to:
periodically transmit a slot format indication to another UE, one or more bit fields included in the slot format indication indicating a periodicity associated with a communication configuration of a slot.

14. A method of wireless communication performed by a user equipment (UE), comprising:
receiving configuration information associated with a dedicated resource pool for sidelink communications in a sidelink network, wherein the dedicated resource pool includes a first group of resources dedicated for communication of sidelink control information and a second group of shared resources for communicating data via the sidelink network,
wherein the first group of resources has a granularity of one or more resource elements across frequency and a granularity of one or more symbols across time, and
wherein the second group of resources has a granularity of a subchannel across frequency and a granularity of a slot across time,
wherein the subchannel comprises one or more resource blocks and the slot comprises a time period; and
transmitting or receiving the sidelink control information in the sidelink network utilizing one or more resources included in the first group of resources.

15. The method of claim 14, wherein transmitting the sidelink control information includes transmitting the sidelink control information via a sidelink-downlink communication to another UE.

16. The method of claim 14, wherein receiving the sidelink control information includes receiving the sidelink control information via a sidelink-uplink communication from another UE.

17. The method of claim 14, wherein the first group of resources includes a resource block associated with a subchannel of a shared resource pool associated with a physical shared sidelink channel.

18. The method of claim 14, wherein the first group of resources is associated with a plurality of symbols in a time domain and with a plurality of resource blocks or resource elements in a frequency domain.

19. The method of claim 14, wherein the first group of resources supports repetition or aggregation of the sidelink control information.

20. The method of claim 14, wherein the first group of resources supports utilization of one or more resource blocks included in the first group of resources based at least in part on a payload size associated with the sidelink control information.

21. The method of claim 14, further comprising:
transmitting a slot format indication to another UE, the slot format indication indicating whether a given slot is configured for transmitting sidelink-downlink communication to the other UE or for receiving sidelink-uplink communication from the other UE.

22. The method of claim 14, further comprising:
transmitting a slot format indication via a physical sidelink feedback channel, the slot format indication indicating whether a given slot is configured for transmitting sidelink-downlink communication or for receiving sidelink-uplink communication.

23. The method of claim 14, further comprising:
transmitting a slot format indication to another UE, one or more bits included in the slot format indication indicating whether one or more slots are configured for transmitting sidelink-downlink communication or for receiving sidelink-uplink communication.

24. The method of claim 14, further comprising:
transmitting a group-common slot format indication to a plurality of UEs, the group-common slot format indication including a plurality of respective bits, associated with the plurality of UEs, for indicating whether a given slot is configured for transmitting sidelink-downlink communication or for receiving sidelink-uplink communication.

25. The method of claim 14, further comprising:
transmitting a slot format indication via sidelink control information, the slot format indication indicating whether a given slot is configured for transmitting sidelink-downlink communication or for receiving sidelink-uplink communication.

26. The method of claim 14, further comprising:
transmitting a slot format indication to another UE, one or more bit fields included in the slot format indication indicating a periodicity associated with a communication configuration of a slot, the transmitting the slot format indication comprising periodically transmitting the slot format indication.

27. A non-transitory computer-readable medium storing a set of instructions for wireless communication, the set of instructions comprising:
one or more instructions that, when executed by one or more processors of a user equipment (UE), cause the UE to:
receive configuration information associated with a dedicated resource pool for sidelink communications in a sidelink network, wherein the dedicated resource pool includes a first group of resources dedicated for communication of sidelink control information and a second group of shared resources for communicating data via the sidelink network,
wherein the first group of resources has a granularity of one or more resource elements across frequency and a granularity of one or more symbols across time, and
wherein the second group of resources has a granularity of a subchannel across frequency and a granularity of a slot across time,
wherein the subchannel comprises one or more resource blocks and the slot comprises a time period; and
transmit or receive the sidelink control information in the sidelink network utilizing one or more resources included in the first group of resources.

28. The non-transitory computer-readable medium of claim 27, wherein the one or more instructions, that cause the UE to transmit the sidelink control information, cause the UE to transmit the sidelink control information via a sidelink-downlink communication to another UE.

29. An apparatus for wireless communication, comprising:
means for receiving configuration information associated with a dedicated resource pool for sidelink communications in a sidelink network, wherein the dedicated resource pool includes a first group of resources dedicated for communication of sidelink control information and a second group of shared resources for communicating data via the sidelink network, wherein the first group of resources has a granularity of one or more resource elements across frequency and a granularity of one or more symbols across time, and wherein the second group of resources has a granularity of a subchannel across frequency and a granularity of a slot across time, wherein the subchannel comprises one or more resource blocks and the slot comprises a time period; and means for transmitting or receiving the sidelink control information in the sidelink network utilizing one or more resources included in the first group of resources.

30. The apparatus of claim 29, wherein the means for transmitting the sidelink control information includes means for transmitting the sidelink control information via a sidelink-downlink communication to another apparatus.

* * * * *